United States Patent [19]

Degen et al.

[11] Patent Number: 4,702,840

[45] Date of Patent: Oct. 27, 1987

[54] CHARGE MODIFIED POLYAMIDE MEMBRANE

[75] Inventors: Peter J. Degen; Irving B. Joffee, both of Huntington; Thomas C. Gsell, Levittown, all of N.Y.

[73] Assignee: Pall Corporation, Glen Cove, N.Y.

[21] Appl. No.: 848,911

[22] Filed: Apr. 7, 1986

Related U.S. Application Data

[63] Continuation of Ser. No. 460,019, Jan. 21, 1983, abandoned, which is a continuation-in-part of Ser. No. 346,119, Feb. 5, 1982, abandoned.

[51] Int. Cl.$^4$ .............................................. B01D 13/00
[52] U.S. Cl. ................................... 210/638; 210/490; 210/500.38; 521/27
[58] Field of Search ................... 210/500.38, 638, 490; 264/41; 521/27; 427/244, 245; 55/16

[56] References Cited

U.S. PATENT DOCUMENTS

| | | | |
|---|---|---|---|
| 2,823,189 | 2/1958 | Floyd | 260/18 |
| 2,956,968 | 10/1960 | Swann et al. | 260/21 |
| 2,970,971 | 2/1961 | Katz et al. | 260/18 |
| 3,062,773 | 11/1962 | Rogier | 260/42 |
| 3,159,612 | 12/1964 | Tsou et al. | 260/89.7 |
| 3,197,427 | 7/1965 | Schmalz | 260/29.2 |
| 3,224,990 | 12/1965 | Babcock | 260/29.2 |
| 3,240,761 | 3/1966 | Kelm et al. | 260/78 |
| 3,510,417 | 5/1970 | Mizutani et al. | 204/180 |
| 3,808,305 | 4/1974 | Gregor | 264/331 |
| 4,047,908 | 9/1977 | Steigelmann et al. | 55/158 |

FOREIGN PATENT DOCUMENTS

| | | | |
|---|---|---|---|
| 746629 | 7/1970 | Belgium | 210/500 M |
| 2452310 | 10/1980 | France | 210/500 M |
| 1302619 | 1/1973 | United Kingdom | 210/500 M |
| 1602085 | 11/1981 | United Kingdom | 210/23 R |

Primary Examiner—Frank Spear
Attorney, Agent, or Firm—Leydig, Voit & Mayer

[57] ABSTRACT

Surface modified, skinless, hydrophilic, microporous, polyamide membranes are formed by preparing a casting solution comprised of (A) a casting resin system comprised of (a) an alcohol-insoluble polyamide resin, and (b) a cationic, water-soluble, quaternary ammonium, thermosetting, membrane surface modifying polymer, and (B) a solvent system in which the casting resin system is soluble; inducing nucleation of the casting solution by controlled addition of a nonsolvent for the casting resin system under controlled conditions to obtain a visible precipitate of casting resin system particles, thereby forming a casting composition; spreading the casting composition on a substrate to form a thin film; contacting and diluting the film of the casting composition with a liquid nonsolvent system for the casting resin system, thereby precipitating the casting resin system from the casting composition in the form of a thin, skinless, hydrophilic, surface modified, microporous, polyamide membrane; and washing and drying the membrane. The membranes of this invention are characterized by having fine pore ratings, the surface properties thereof being substantially controlled by cationic, quaternary ammonium groups of a modifying polymer thereby providing a positive zeta potential in alkaline media, and for those with moderate or low levels of surface modifying polymer present, a time to reach an effluent resistivity of 14 megaohms/cm under the Resistivity Test of 10 minutes or less. They have greatly enhanced filtration efficiency over a broad pH range with a variety of contaminants, including very fine negatively charged particles, bacteria and endotoxins.

64 Claims, 1 Drawing Figure

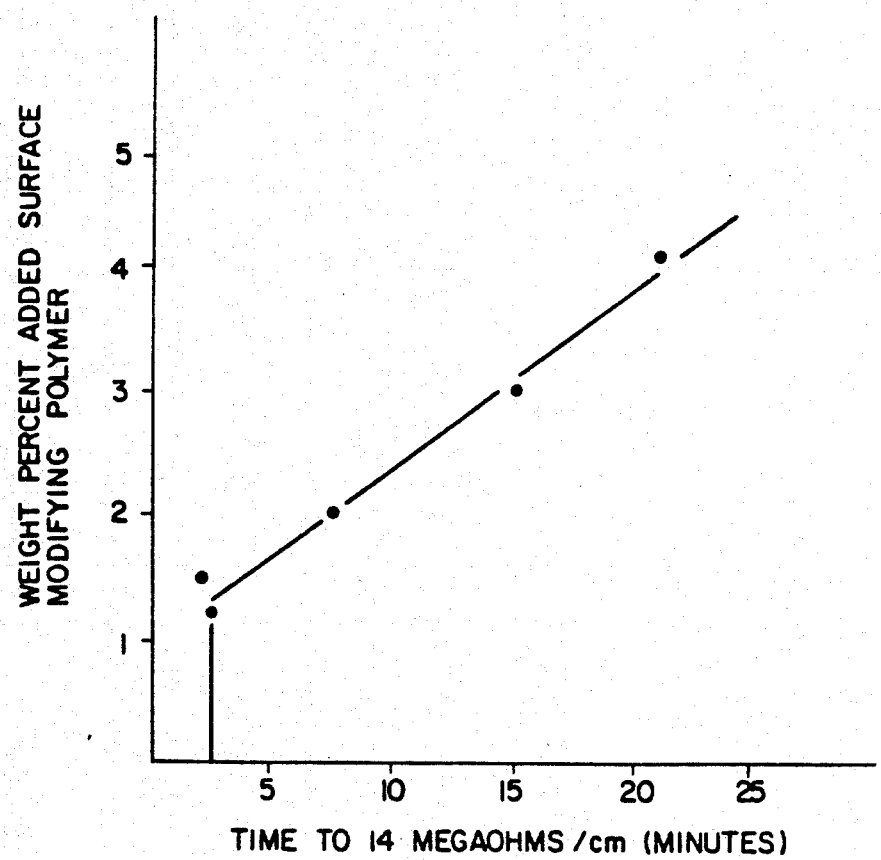

CHARGE MODIFIED POLYAMIDE MEMBRANE

This application is a continuation of application Ser. No. 460,019, filed Jan. 21, 1983, which is a continuation-in-part of application Ser. No. 346,119, filed Feb. 5, 1982, both now abandoned.

TECHNICAL FIELD

The present invention relates to microporous membranes, their preparation and their use. More particularly, the invention relates to novel microporous polymeric membranes with enhanced filtration efficiencies for the removal of fine particulates as well as the ability to remove certain large molecules from fluid media.

Microporous membranes have been recognized for some time as useful for filtering fine particles from gas and liquid media. U.S. Pat. No. 4,340,479 discloses a process for manufacturing microporous polyamide membranes with certain desirable filtration characteristics. Membranes prepared by the process disclosed in U.S. Pat. No. 4,340,479 are hydrophilic, have narrow pore size distributions and pore ratings as fine as about 0.04 micrometer. For many filtering requirements those membranes perform very effectively. For certain fine particulates, e.g., substantially below 0.1 micrometer in diameter, they are not effective. The reasons for this are related to the mechanisms by which filters work.

A filter membrane can achieve fluid clarification by different mechanisms. Particulate material can be removed through mechanical sieving wherein all particles larger than the pore diameter of the filter membrane are removed from the fluid. With this mechanism, filtration efficiency is controlled by the relative size of the contaminant and filter pore diameter and the efficient removal of very small particles, e.g., less than 0.1 micrometer in diameter, therefore requires filter membranes with very small pore sizes. Such fine pore filter membranes tend to have the undesirable characteristics of high pressure drop across the filter membrane, reduced dirt capacity and shortened filter life.

A filter may also remove suspended particulate material by adsorption onto the filter membrane surfaces. Removal of particulate material by this mechanism is controlled by the surface characteristics of (1) the suspended particulate material and (2) the filter membrane. Most suspended solids which are commonly subjected to removal by filtration are negatively charged in aqueous systems. This feature has long been recognized in water treatment processes where cationic flocculating agents, oppositely charged to the suspended matter, are employed to improve settling efficiencies during water clarification.

Colloid stability theory can be used to predict the interactions of electrostatically charged particles and surfaces. If the charges of suspended particle and the filter membrane surface are of like sign and with zeta potentials of greater than about 20 mV, mutual repulsive forces will be sufficiently strong to prevent capture by adsorption. If the zeta potentials of the suspended particle and the filter membrane surface are small, or more desirably of opposite sign, particles will tend to adhere to the filter membrane surfaces with high capture efficiencies. Most suspensions of particles encountered in industrial practice have a negative zeta potential. Thus microporous filter membranes characterized by positive zeta potentials are capable in a large number of industrial applications of removing particles much smaller than the pore diameters of the membrane through the mechanism of electrostatic capture.

The desirable hydrophilic properties of the polyamide membranes of U.S. Pat. No. 4,340,479 are believed to result in part from the high concentration on the exposed membrane surfaces of amine and carboxylic acid end groups of the polyamide. The positioning of these groups is also believed to provide the membranes of this patent with their unusual zeta potential versus pH profile. That profile, positive at pHs below 6.5, becomes negative in alkaline media. Accordingly, the membranes of U.S. Pat. No. 4,340,479 have limited ability to filter very fine negatively charged particulates in alkaline media.

By modifying the surface characteristics of the hydrophilic membranes disclosed in U.S. Pat. No. 4,340,479 to, for instance, provide a strongly positive zeta potential over the alkaline range, the spectrum of uses for these materials in filtration is substantially expanded.

The present invention is directed, then, to the preparation and use of surface modified, microporous, hydrophilic, polyamide membranes. The process of this invention provides microporous membranes with narrow pore size distributions and fine pore ratings ranging from about 0.04 to about 10 micrometers, preferably 0.1 to 5 micrometers, and filtration efficiencies ranging from molecular dimensions (pyrogens) to particulates larger than the pore diameters. The surface modified membranes of this invention with their strongly positive zeta potentials are useful for their greatly enhanced filtration efficiency over a broad pH range and with a wide variety of contaminants including particulates, particularly very fine negatively charged particles, bacteria and endotoxins. Membranes of the present invention also are capable of delivering ultrapure effluent water rapidly after the onset of filtration. The ability to deliver such high purity effluent water, free from microparticulate and ionic contaminants, makes the products of this invention particularly desirable for the filtration of aqueous fluids employed in microelectronics manufacture.

DISCLOSURE OF INVENTION

The subject invention is directed to surface modified, hydrophilic, microporous, polyamide membranes and a process for preparing them by the steps of (1) preparing a casting solution comprised of (A) a casting resin system comprised of (a) an alcohol-insoluble polyamide resin having a ratio $CH_2:NHCO$ of methylene $CH_2$ to amide $NHCO$ groups within the range from about 5:1 to about 7:1 and (b) a membrane surface modifying polymer; and (B) a solvent system in which the casting resin system is soluble; (2) inducing nucleation of the casting solution by controlled addition of a nonsolvent for the casting resin system under controlled conditions of concentration, temperature, addition rate and degree of agitation to obtain a visible precipitate of casting resin system particles which may or may not thereafter partially or completely redissolve, thereby forming a casting composition; (3) preferably filtering the casting composition to remove visible precipitated particles; (4) spreading the casting composition on a substrate to form a thin film thereof on the substrate; (5) contacting and diluting the film of casting composition with a liquid nonsolvent system for the casting resin system comprised of a mixture of solvent and nonsolvent liquids and containing a substantial proportion of the solvent liquid but less than the proportion in the casting composition, thereby precipitating the casting resin system from the casting composition in the form of a thin, skinless, hydrophilic, surface modified, microporous membrane; (6) washing the membrane; and (7) drying the membrane.

The surface modified, alcohol-insoluble polyamide membranes of this invention have the unusual property of being hydrophilic, i.e., they are readily wetted by water, have pore sizes (also referred to as pore ratings or pore diameters) of from about 0.04 to about 10 micrometers or more, modified zeta potentials, i.e., strongly positive zeta potentials in alkaline media, filtration efficiencies ranging from molecular dimensions (pyrogens) to particulates larger than the pore diameters and, accordingly, are highly desirable as filter media, particularly for producing bacterially sterile filtrates, as well as for filtration of high purity water in microelectronics manufacture due to their ability to deliver ultrapure filtrate free from microparticulates and ionic contaminants.

The membrane surface modifying polymers or resins useful in preparing the membranes of this invention are the cationic, water-soluble, quaternary ammonium, thermosetting polymers. Preferred polymers within this class are the epoxy-functional polyamido/polyaminoepichlorohydrin resins. The epoxy-functional polyamine epichlorohydrin resins are particularly preferred.

BRIEF DESCRIPTION OF THE DRAWING

FIG. 1 is a graph of percent added surface modifying polymer versus time required to obtain 14 megaohms/cm effluent water for a surface modified membrane of this invention.

BEST MODE FOR CARRYING OUT THE INVENTION

The subject invention is directed to surface modified, hydrophilic, microporous, polyamide membranes and a process for preparing them by the steps of (1) preparing a casting solution comprised of (A) a resin casting system comprised of (a) an alcoholinsoluble polyamide resin having a ratio of $CH_2$:NHCO of methylene $CH_2$ to amide NHCO groups within the range of from about 5:1 to about 7:1 and (b) a membrane surface modifying polymer; and (B) a solvent system in which the casting resin system is soluble; (2) inducing nucleation of the casting solution by controlled addition of a nonsolvent for the casting resin system under controlled conditions of concentration, temperature, addition rate and degree of agitation to obtain a visible precipitate of casting resin system particles which may or may not thereafter partially or completely redissolve, thereby forming a casting composition; (3) preferably filtering the casting composition to remove visible precipitated particles; (4) spreading the casting composition on a substrate to from a thin film thereof on the substrate; (5) contacting and diluting the film of casting composition with a liquid nonsolvent system comprised of a mixture of solvent and nonsolvent liquids and containing a substantial proportion of the solvent liquid bu less than the proportion in the casting solution, thereby precipitating the casting resin system from the casting solution in the form of a thin, skinless, hydrophilic, surface modified, microporous membrane; (6) washing the membrane to remove solvent; and (7) drying the membrane.

As previously discussed, the preparation of hydrophilic, microporous, polyamide filter membranes is the subject of U.S. Pat. No. 4,340,479, the disclosure of which is incorporated herein by reference.

The hydrophilic polyamide membranes of U.S. Pat. No. 4,340,479 are prepared from alcohol-insoluble polyamide resins having a methylene to amide ratio in the range of about 5:1 to about 7:1, as are the surface modified membranes of this invention. Membranes of this group include copolymers of hexamethylene diamine and adipic acid (nylon 66), copolymers of hexamethylene diamine and sebacic acid (nylon 610) homopolymers of poly-e-caprolactam (nylon 6) and copolymers of hexamethylene diamine and azelaic acid (nylon 69). Nylon 66 is preferred.

In the process for manufacturing the membranes of U.S. Pat. No. 4,340,479 the polyamide resin is dissolved in a solvent, such as formic acid, and a nonsolvent, such as water, is added under controlled conditions of agitation to achieve nucleation of the solution.

In inducing nucleation of the polyamide solution a visible precipitate is formed. This precipitate may partially or completely redissolve. Preferably, any visible particles which do not redissolve should be filtered out of the system, e.g., with a 10 micrometer filter, prior to casting the nucleated solution or casting composition.

The nucleated solution or casting composition is then cast onto a substrate, e.g., a porous polyester sheet or web or a non-porous polyester sheet, in the form of a film and this film of solution is then contacted with and diluted by a liquid nonsolvent system which is a mixture of a solvent and a nonsolvent for the polyamide resin. A preferred nonsolvent liquid system for both the subject invention and that of U.S. Pat. No. 4,340,479 is a solution of water and formic acid. For this invention, the formic acid is preferably present in an amount of from about 35% to about 60% by weight. The polyamide resin thereupon precipitates from the solution, forming a hydrophilic membrane sheet on the substrate which can be washed to remove the solvent. The membrane can then be stripped from the substrate and dried or, if the substrate is porous, it can be incorporated in the membrane to serve as a permanent support, in which event it is dried with the membrane. If the substrate is to be incorporated into the membrane, it should be porous and capable of being wetted and impregnated by the casting composition, e.g., a porous, fibrous, polyester sheet with an open structure. By appropriate control of process variables, membranes with through pores of uniform size and shape can be obtained. Conversely, if desired, tapered through pores, wider at one surface of the sheet and narrowing as they proceed toward the opposite surface of the sheet, can be obtained.

The same general procedure described above is followed in manufacturing the surface modified membranes of this invention except that the membrane surface modifying polymers used in the subject invention are combined with the polyamide resin and the resulting combined modifying polymer/polyamide casting solution, after nucleation to form the casting composition, is cocast, resulting in unique membranes with novel filtration properties extending the range of uses for microporous polyamide membranes.

The novel properties of the filter membranes prepared by the process of U.S. Pat. No. 4,340,479 are believed to result in part from the high concentration on the membrane surfaces of amine and carboxylic acid end groups of the polyamide. These amine and carboxylic acid functions on the membrane surfaces result in unexpected membrane properties, such as their unusual zeta potential versus pH profile and their hydrophilic character, that is being readily wetted by water, typically being wetted through in 3 seconds or less, preferably 1 second or less, when immersed in water.

As previously stated, it has now been discovered that the surface modified membranes of this invention having unexpected and novel filtration properties can be prepared using the general procedure disclosed in U.S. Pat. No. 4,340,479 but with the addition of low levels of selected membrane surface modifying polymers to the polyamide membrane casting solutions. Thus, surface modified, hydrophilic, microporous polyamide membranes with a strongly positive zeta potential in alkaline media, having low levels of extractable matter, and having the ability to deliver ultrapure water, free from microparticulate and ionic contaminants, quickly after the onset of filtration as required in microelectronics manufacture, are readily and economically prepared by the cocasting process of the present invention. Addition of as little as one weight percent, based on the polyamide resin, of the membrane surface modifying polymer to the membrane casting solution has been found to produce microporous hydrophilic membranes whose surface properties are substantially controlled by the modifying polymer. It is the ability of relatively small amounts of the membrane surface modifying polymer to control the surface properties of the membranes of the present invention which provides the desirable characteristics of the subject membranes. Accordingly, the filtration characteristics and the physiochemical surface behavior of these membranes are controlled by a surprisingly low proportion of the modifying polymer.

The (1) surface modified, polyamide membranes prepared using the cocasting process of this invention share certain characteristics with both (2) the base polyamide membranes prepared using the same general casting process but without the modifying polymer present in the casting solution and (3) base polyamide membranes prepared in the same manner as the membranes of (2) above but which have subsequently been coated with a cationic polymer or resin by contacting the finished base polyamide membrane with a solution of the cationic polymer or resin.

All three types are skinless, hydrophilic, (as defined above and in U.S. Pat. No. 4,340,479) and microporous. Each has desirable filtering characteristics for fine particulates derived in part from their fine pore ratings and narrow pore size distributions. Unlike the base polyamide membranes of (2) above, however, the surface modified polyamide membranes of (1) above and the coated polyamide membranes of (3) above exhibit a positive zeta potential in alkaline media which broadens the spectrum of uses for the membranes of (1) and (3).

Surface modified polyamide membranes (1) of this invention and base polyamide membranes (2) also possess the ability to deliver ultrapure water, free from microparticulate and ionic contaminants, quickly after the onset of filtration. Conversely, the coated polyamide membranes (3) do not have this ability to as great an extent as either (1) or (2). This ability, as described in detail hereinafter, is highly desirable in microelectronics manufacturing applications. Since only the surface modified polyamide membranes (1) of this invention have the unique combination of a positive zeta potential in alkaline media and the ability to deliver ultrapure water, free from microparticulate and ionic contaminants, quickly upon the onset of filtration, the desirability of this class of membrane is manifest. The highly desirable properties of the membranes of the subject invention are believed to result from the unique method of preparation in which the modifying polymer becomes an integral part of the overall structure of the membrane. The ability to prepare these membranes in a clean, straightforward, efficient and economic manner heightens their desirability.

Membrane Surface Modifying Polymers

The membrane surface modifying polymers or resins (sometimes hereinafter "modifying polymer(s)") useful in the process of this invention are the cationic, water-soluble, quaternary ammonium, thermosetting polymers. The preferred modifying polymers useful in the present invention are those cationic polymers which undergo crosslinking reactions through reaction of epoxide groups. Epoxide functional cationic polymers or resins generally produce charge modified surfaces which, upon proper conversion to the crosslinked state by the application of heat, are found to be mechanically strong and chemically resistant to a wide range of aggressive chemical environments.

Epoxide functional or epoxide based cationic thermosetting polymers are also preferred due to favorable interactions believed to occur between the amine and carboxylic acid end groups of the polyamide. Amine functions and carboxylic acid functions are known to coreact efficiently with epoxide functional polymers. It is believed that the amine and carboxylic acid groups of the polyamide resin react with the epoxide groups of the modifying polymer. While it is believed that the reaction of these groups occurs throughout the membrane structure, the nature of the membrane forming process is believed to cause preferential orientation of the modifying polymer toward the surfaces of the formed membrane. By this is meant that as a result of the cocasting process of this invention the modifying polymer determines the surface characteristics of the membrane. Further, the reaction of these groups is believed to result in intimate bonding of the modifying polymer and the polyamide resin forming an integral structure, thereby reducing the amount of extractable matter in the membrane, increased homogeneity of the surfaces of the membrane and increased general stability of the membranes produced by the process of this invention.

Another desired characteristic of the modifying polymers useful in preparing microporous membranes of this invention relates to the nature of the cationic charge in these polymers. Since their cationicity stems from the presence of quaternary ammonium groups they maintain their positive charge in acid, neutral and alkaline conditions of pH.

Surprisingly, during the membrane formation process, the low added levels of modifying polymers appear to be preferentially oriented in such a manner as to result in membranes whose surface characteristics are substantially controlled by the membrane surface modifying polymer. This result is believed to reflect both the unique membrane forming process and the hydrophilic nature of the modifying polymers. The combination of their hydrophilicity, their apparent strong interaction with the polyamide end groups and the unique membrane cocasting process are believed responsible for the apparent preferential orientation of the modifying polymers toward the membrane surface.

Also, surprisingly, while the surface modifying polymers are highly soluble in water, they are not leached out of the casting composition into the nonsolvent liquid, typically water, which is used to precipitate the casting resin system. Apparently, the strong interaction of the modifying polymer with the polyamide end groups coupled with the preferential orientation of the modifying polymer toward the membrane surfaces (both pore and external), perhaps under the influence of the nonsolvent liquid, combine to provide a membrane whose surface properties are substantially controlled by the cationic, quaternary ammonium groups of the modifying polymer. At any rate, the unexpected result is highly desirable, providing a membrane with unique characteristics and an efficient and economic process for preparing it.

The epoxy-functional or epoxy-based resins preferred in this invention fall into two classes: polyamido/polyamino-epichlorohydrin resins and polyamineepichlorohydrin resins. Polyamido/polyamino-epichlorohydrin resins are reaction products of epichlorohydrin with polyamides containing primary, secondary and tertiary amines in the backbone. Representative materials of this class are described in U.S. Pat. Nos. 2,926,154, 3,332,901, 3,224,986 and 3,855,158, the disclosures of which are incorporated herein by reference.

Commercially available water-soluble, non-colloidal cationic thermosetting polymers of the polyamido/polyamino-epichlorohydrin class, which are preferred for the purposes of this invention, are Kymene ® 557 and the Polycup ® series of resins manufactured by Hercules Incorporated. It is believed that these resins are prepared by reacting epichlorohydrin with low molecular weight polyamides which contain amino groups in the polymer backbone. The reaction products have been described as containing quaternary ammonium groups present in the form of azetidinium ions, four-membered ring structures. Kymene ® 557 and the members of the Polycup ® series have been described as being chemically and structurally similar but differing in their molecular weight.

Polyamine-epichlorohydrin resins are condensation products of polyamines such as polyalkylene polyamines or their precursors with epichlorohydrin. They differ from the polyamido/polyamino-epichlorohydrin resins in that the polyamine-epichlorohydrins contain no amide linkages as part of the backbone of the polymer. Commercially available compositions of this type are disclosed in (1) U.S. Pat. No. 3,885,158, which discloses polymers prepared by reacting epichlorohydrin with the condensation product of polyalkylene polyamines and ethylene dichloride and in (2) U.S. Pat. No. 3,700,623, which discloses polymers made by reacting epichlorohydrin with polydiallymethylamine. Compositions of the first type are exemplified by Santo-res ® 31 (Monsanto, Inc.) and compositions of the second type are exemplified by Resin R4308 (Hercules Inc.). The disclosures of U.S. Pat. Nos. 3,885,158 and 3,700,623 are incorporated herein by reference.

Especially preferred are the epoxide functional water-soluble cationic polymers which fall in the class of polyamine-epichlorohydrin resins and which bear quaternary groups in the cured state. The fact that quaternary groups remain in the resin in the crosslinked state is important, since it effects the pH range over which the membrane can maintain a positive zeta potential. A quaternary ammonium group is inherently cationic; hence its positive charge is independent of its pH environment. Resin R4308 and Santo-res ® 31 each bear quaternary ammonium groups in the cured state and bear a positive charge at alkaline pH.

Many of the surface modifying polymers useful in the subject invention require activation. For the purpose of providing extended shelf life or storage stability to these resins, the epoxide groups are chemically inactivated to prevent premature crosslinking of these polymers. Thus, prior to the use of these polymers for the purposes of this invention, the polymers are activated into the reactive, thermosetting state by regeneration of the epoxide groups. Typically, activation entails adding sufficient aqueous caustic to a solution of the inactive polymer to chemically convert the inactive chlorohydrin form to the crosslinking epoxide form. The parts by weight of aqueous caustic per weight polymer vary with the product and are specified by the manufacturer. The activation process is efficient and complete activation is generally achieved in about thirty minutes, whereupon the polymer solution is suitable for use.

Process Conditions

The preparation of the surface modified, skinless, hydrophilic, microporous, alcohol-insoluble polyamide membranes of this invention is carried out under controlled conditions including controlled addition of the nonsolvent, e.g., water, to a solution of the polyamide and the membrane surface modifying polymer, control of the concentration of the constituents, control of the temperature and control of the agitation of the system to induce the proper level of nucleation.

U.S. Pat. No. 4,340,479, as discussed above, has been incorporated herein by reference. The detailed discussion therein concerning the relationship of the parameters set out above is generally applicable herein and will not be repeated. Rather, a summary of the operative ranges and their relationship will be provided.

Controlled Addition Of The Nonsolvent

The manner and rate of addition of the nonsolvent to induce nucleation is interrelated with other process variables, such as intensity of mixing, temperature and the concentration of the various components of the casting solution. The term "casting solution" is used here to mean the solution made up of (A) the casting resin system and (B) the solvent system. Addition of the nonsolvent is conveniently carried out through an orifice at a rate sufficient to produce a visible precipitate which, preferably, at least in part subsequently redissolves. Maintaining all other parameters constant, casting compositions with quite different characteristics in terms of pore sizes of the resulting membranes will be obtained by varying the diameter of the orifice. The required degree of nucleation resulting from nonsolvent addition rate and orifice configuration is therefore best established by trial and error for each given system.

The controlled addition of nonsolvent is discussed in detail in U.S. Pat. No. 4,340,479. Prior to addition of the nonsolvent to induce nucleation, the casting solution is prepared comprised of (A) a casting resin system comprised of (a) an alcohol-insoluble polyamide resin as described above and (b) a membrane surface modifying polymer or resin and (B) a solvent system. The solvent system may simply be a solvent for the casting resin system, e.g., formic acid. Alternatively, the solvent system contains an amount of a nonsolvent, e.g., water. The amount of nonsolvent present in the casting solution is always less than the amount necessary to effect the stability of the solution.

Prior to casting, nucleation of the casting solution is initiated by controlled agitation and the controlled addition of nonsolvent liquid. The amount and rate of addition of nonsolvent is controlled along with the intensity of mixing or agitation. The advantage of including nonsolvent as part of the solvent system in making up the casting solution is that better control of the addition of nonsolvent can be maintained during the inducement of nucleation because smaller amounts of nonsolvent are needed due to the nonsolvent already present in the casting solution. As a result, better control of the addition rate can be maintained and a more uniform product of any desired pore size can be obtained.

Concentration Of The Constituents

All parts and percentages herein are by weight unless otherwise noted.

The casting resin system of this invention is comprised of (a) an alcohol-insoluble polyamide resin having a methylene to amide ratio of from about 5:1 to about 7:1 and (b) a surface modifying polymer or resin as previously described.

The proportion of membrane surface modifying polymer to polyamide resin in the casting solution formed as the first step in the process of this invention, based on the polyamide resin, can vary from as much as 20 weight percent to as little as 0.1 weight percent, that is, 20 parts of modifying polymer to 100 parts polyamide resin to 0.1 part of modifying polymer to 100 parts polyamide resin. The generally preferred range of added modifying polymer is from about 1 weight percent to about .5 weight percent. Addition levels of about 1 to 2.0 weight percent have been found particularly desirable. It is believed that this moderate level of modifying polymer produces substantially complete membrane surface modification, resulting in a membrane whose surface characteristics are substantially controlled by the cationic, quaternary, ammonium groups of the modifying polymer. Thus, for the purpose of membrane efficiency and production economy, the addition of about 1 to 2.0 weight percent of the modifying polymer, based on the polyamide resin, is preferred with the polyamide resin present in the casting solution in an amount of from about 10% to 18%, and the surface modifying polymer present in an amount of from about 0.1% to 0.9%, (based on all components present in the solution).

The amount of solvent present in the casting solution formed as the first step in the process of this invention will vary dependent upon the polyamide resin and the modifying polymer used. In general, the amount of solvent present will range from about 60 to 80 percent (based on all components present in the solution).

It should be understood that the casting solution comprises both (1) the casting resin system, i.e., the polyamide resin and the modifying polymer or resin, and (2) the solvent system, i.e., a solvent for the polyamide resin/modifying polymer casting resin system (such as formic acid) and, if desired, a minor amount of a nonsolvent for the casting resin system (such as water).

The amount of nonsolvent present in the casting solution will in all cases be less than the amount in the liquid nonsolvent system (membrane forming bath) used to precipitate the casting resin system from the casting composition, the casting composition being the composition formed from the initially prepared casting solution by inducing nucleation in that solution and, preferably, removing visible particles from the resulting composition. Generally, when the nonsolvent is water, it will be present in the casting solution in an amount ranging from zero, preferably at least 5 percent, preferably 10 to 20 percent, and up to about 30 percent by weight (again based on all the components present in the solution).

For a preferred casting solution of this invention, a polyamine epichlorohydrin resin or polymer, preferably Resin R4308, is present in the casting solution in an amount of from about 0.1 to about 0.9 percent, polyhexamethylene adipamide is present in an amount of from about 10 to about 18 percent, formic acid is present in an amount of from about 65 to about 75 percent, and water is present in an amount of 10 to 20 percent, all parts by weight and based on the total composition of the casting solution.

Control Of The Temperature

The temperature of the casting composition is not critical so long as it is maintained at a constant value. Generally, however, a decrease in casting composition temperature produces a higher degree of nucleation.

Control Of The Agitation

The intensity of mixing in a given system is a function of a large number of interrelated variables. For any given system, the mixing intensity can be expressed in terms of the rotation rate of the agitator. Such equipment has many forms and designs commonly used in the mixing art and is difficult to quantify. Thus, trial and error experimentation involving customary variables is necessary to establish the operable range of mixing intensities suitable for a particular system. Typically, using a 2½ inch rotor operating at a throughput of about 500 to 1500 grams of solution per minute requires mixing speeds in the range of from 1500 to 4000 RPM to produce membranes with pore ratings in the range of interest.

The liquid nonsolvent system used to dilute the film of casting composition and thereby precipitate the casting resin system, typically by immersion in a bath of the liquid nonsolvent system, can, and preferably does, contain a substantial amount of a solvent for the casting resin system, preferably the one present in the casting solution. That is, the liquid nonsolvent system is comprised of a mixture of a nonsolvent for the casting resin system, e.g., water, and a solvent for the casting resin system, e.g., formic acid. However, on a percentage basis the amount of solvent present in the liquid nonsolvent system will be less than the amount present in the casting solution. Typically, the liquid nonsolvent system will be comprised of a nonsolvent, e.g., water, present in an amount ranging from about 65 to about 40 weight percent and a solvent for the casting resin system, e.g., formic acid, present in an amount ranging from about 35 to about 60 weight percent. Preferably, the bath of the liquid nonsolvent system is maintained at a substantially constant composition with respect to nonsolvent and solvent by the addition of nonsolvent to the bath, preferably continuously, in a quantity sufficient to compensate for solvent diffusion into the bath from the thin film of casting composition.

Solvents

The solvent comprising at least part of the solvent system used in the casting solutions of the subject invention can be any solvent for the casting resin system, i.e., the combination of the polyamide resin and the modifying polymer. A preferred solvent is formic acid. Other suitable solvents are other liquid aliphatic acids, such as acetic acid and propionic acid; phenols, such as phenol; the cresols and their halogenated derivatives; inorganic acids, such as hydrochloric, sulfuric and phosphoric; saturated aqueous or alcohol solutions of alcohol-soluble salts, such as calcium chloride, magnesium chloride and lithium chloride; and hydroxylic solvents, including halogenated alcohols.

The only criteria in selecting a solvent are that (1) it form a solution of the polyamide resin and the modifying polymer, (2) it not react chemically with either the polyamide resin or the surface modifying polymer and (3) it be capable of ready removal from the surface modified polyamide membrane. Practical considerations also are important, of course. For example, inorganic acids are more hazardous to work with than are others of the named solvents and corrosion problems must be dealt with. Since formic acid meets the criteria listed above and is a practical material as well, it is the solvent of choice. Due to economy and ease of handling, water is the non-solvent of choice for use in the solvent system when a non-solvent is used in the solvent system. In like manner, the preferred nonsolvent added to the casting solution to induce nucleation thereof is water. And, the preferred nonsolvent component of the liquid nonsolvent system used to precipitate the casting resin system from the film of casting composition is also water for the same reasons it is the nonsolvent of choice in the solvent system.

The membrane products of this invention are characterized by being hydrophilic, skinless, microporous and alcohol-insoluble with narrow pore size distributions, filtration efficiencies from molecular dimensions (pyrogens) up to particulates larger than the pore diameters, pore size ratings of from about 0.04 to about 10 micrometers, a preferred range being from 0.1 to 5 micrometers, film thicknesses in the range of from about 0.01 to 1.5 millimeters, preferably from about 0.025 to about 0.8 mm, and by having a positive zeta potential over a broad pH range of from about 3 to about 10. Additionally, the membranes of this invention can be characterized as having surface properties which are substantially controlled by cationic, quaternary ammonium groups of the cationic, quaternary ammonium, thermoset, surface modifying polymer. Surprisingly, the low added levels of quaternary, ammonium, surface modifying polymers produce membranes whose surface characteristics substantially reflect the presence of the cationic, quaternary, ammonium groups. Along with their excellent pore structure and positive zeta potential, these membranes have very low levels of extractable matter making them especially desirable in pharmaceutical and electronic filtration applications. Additionally, these membranes can be conveniently and economically prepared by a straightforward, continuous process as described hereinafter.

The surface modified membranes of this invention with moderate or low levels of modifying polymer have rinse up times to deliver effluent water having a resistivity of 14 megaohms/cm of 10 minutes or less, and preferably less than 5 minutes, when tested using the Resistivity Test described hereinafter.

Surface modified membranes of this invention, particularly those with moderate or low levels of surface modifying polymers present, are believed to have quick rinse up times because of the apparent interaction between the surface modifying polymer and the polyamide resin end groups. This interaction and the resulting integral nature of the membranes of this invention are believed to lead to a reduction in the extractables available for sloughing off and being carried through the filter and into the effluent, a phenomenon believed to occur with coated membranes.

Method of Testing the Surface Modified Membranes of the Following Examples

The properties of the membranes of the following examples were evaluated by a variety of test methods, as described below:

(a) Zeta Potential

The zeta potentials of membranes of this invention were calculated from measurements of the streaming potential generated by flow of a 0.001 weight percent solution of KCl in distilled water through several layers of the membrane secured in a filter sheet or membrane holder. Zeta potential is a measure of the net immobile electric charge on a membrane surface exposed to a fluid. It is related to the streaming potential generated when the fluid flows through the membrane by the following formula (J. T. Davis et al, *Interfacial Phenomena*, Academic Press, New York, 1963):

$$\text{Zeta Potential} = \frac{4\pi\eta}{D} \cdot \frac{E_s \lambda}{P}$$

where n is the viscosity of the flowing solution, D is its dielectric constant, $\lambda$ is its conductivity, $E_s$ is the streaming potential and P is the pressure drop across the membranes during the period of flow. In the following examples, the quantity $4\pi\eta/D$ was constant, having a value $2.052 \times 10^{-2}$, making the zeta potential equal to:

$$\text{Zeta Potential(mV)} = \frac{2.052 \times 10^{-2} \cdot E_s(\text{Volt}) \cdot \lambda(\mu\text{mho/cm})}{P(\text{psi})}$$

(b) Capacity of Membrane for Latex Adsorption

A 47 mm disc of membrane was placed in a filter holder with a filtration area of 0.01 ft² (9.29cm²) and was then challenged with a suspension of 0.01 weight percent monodisperse latex spheres in a 0.1 weight percent Triton X-100 in water solution (Triton X-100 is an adduct of nonyl phenol with about 10 moles of ethylene oxide). The latex suspension was pumped through the membrane using a Sage Instrument Model 341 syringe pump at a rate of 2 milliliters per minute. The latex effluent was detected by 90 degrees scattering of 537 nm light as measured by a Brice-Phoenix BP 2000 light scattering photometer using a flow cell.

The latex solution was pumped through the membrane until the light scattering of the effluent began to differ from that observed for a solution of 0.1% Triton X-100 alone, indicating the start of penetration of latex particles through the membrane. The latex adsorption capacity (LAC) was calculated by the following relation:

$$\text{LAC (mg/ft}^2) = 10 \times V$$

where V is the number of milliliters of 0.01 weight percent latex suspension which could be passed through the membrane until passage of latex was observed.

(c) Bacterial Titer Reduction

Membranes sterilized by autoclaving were placed in a suitable stainless steel filter holder and the filter holder with membrane in place was exposed to steam at 123 degrees C. for 30 minutes followed by a 60 minute exhaust period in a Vernitron/Betterbuilt Century 21 Model 222 labotatory sterilizer. They were then challenged with bacteria at four levels: $10^5$, $10^7$, $10^9$ and $10^{11}$ bacteria per square foot for a total challenge of about $10^{11}$ bacteria per square foot of membrane (U. S. P. Bacterial Titer Reduction Test).

The effluent was collected under aseptic conditions in a sterile glass vessel. The number of bacteria in the influent and the effluent was determined by making serial dilutions of these suspensions and plating them on a 0.22 micrometer analytical membrane. These membranes were cultured as Muller-Hinton agar at 38 degrees C. for 24 hours to grow colonies of *Serratia Marcescens* and for 48 hours to grow colonies of *Pseudomonas diminuta*.

The colonies growing on the cultured membranes were counted and the number of colonies observed was assumed equivalent to the number of bacteria in the solution plated.

As in the case of latex particle adsorption titer reduction, $T_R$, is defined as the ratio of influent bacterial count to effluent bacterial count:

$$T_R = \frac{\text{influent count}}{\text{effluent count}}.$$

(d) Endotoxin Titer Reduction Test Method

A 47 mm disc of test membrane was prewetted with isopropyl alcohol and placed in a depyrogenated 47 mm disc holder of filtration area 0.01 ft$^2$, which had been previously depyrogenated by heating in an oven at 250 degrees C. for 1 hour. 50 ml pyrogen-free water was passed through the test membrane and the last 3-4 ml were collected in pyrogen-free glassware and saved as a control for the system. The membrane was then challenged with successive 10 ml aliquots of *E. Coli* 055:B5 purified endotoxin at a flow rate of 5 ml/min/0.01 ft$^2$ and the effluent collected and saved as above. The first aliquot was at a concentration of 1 ng/ml; each successive portion was 10 times the concentration of the previous one up to a maximum of 100 µg/ml. The influent and effluent solutions were diluted with pyrogen-free water as required and analyzed for the presence of endotoxin by the Limulus Amebocyte Lysate Test (United States Pharmocopeia XX, 1980, page 888).

(e) Resistivity Of Effluent Water

Preliminary Preparation

Surface modified, microporous, hydrophilic polyamide membranes of this invention were converted to standard cartridge form by conventional procedures to form cartridges having 7.5 square feet of filtering area. The cartridges were then flushed with 0.2 molar ammonium hydroxide at 50 psi pressure across the cartridge for 6 minutes in order to convert the surface modifying polymer to the hydroxide form. The cartridges were then flushed with 1.5 liters of deionized water to remove residual ammonium hydroxide and then dried for 12 hours at 175 degrees F.. The cartridges were then ready for testing for their ability to deliver high purity water effluent by the flowing Resistivity Test Method.

Resistivity Test

Water of near theoretical resistivity was generated by passing tap water through a Model MA 18090 deionizing bed (Penfield Inc.) and through two Unibed ® ion exchange beds (Culligan Inc.). Test membranes in the form of standard cartridges were mounted in a cartridge housing of common design and subjected to a flow of approximately 1 liter per square foot membrane area per minute using the water from the deionizing system. The effluent water from the elements was monitored for resistivity with a Model 3418 conductivity cell (Yellow Springs Instrument Company). The conductivity cell was connected to a Model 31 conductivity bridge (Yellow Springs Instrument Company) which allowed the direct measurement of effluent resistivity as a function of water flow time. The time in minutes required to reach an effluent resistivity of 14 megaohms per centimeter, the generally accepted water quality limit by the electronics industry, was determined.

General Method I For The Preparation By Continuous Casting Of The Membranes Of The Following Examples 1-12

Nylon 66 resin pellets were dissolved in 98.5% formic acid. Sufficient activated Resin R4308, as a 5 weight percent solution in water, was added to bring the relative proportion of Resin R4308 to nylon 66 to the desired value. This homogeneous casting solution comprised of (1) the casting resin system, i.e., the nylon 66 plus R4308, and (2) the solvent system, i.e., formic acid plus water, was tested for its viscosity at 30 degrees C. on a Rion Viscotester with a number 1 rotor (Model VT-04, available from Extech International Corporation, Boston, Mass.) operating at 63.8 rpm. The viscosity was found to be about 6,000 centipoise. After viscosity testing, the casting solution was delivered by metering pump, at flow rates from 250 grams per minute to about 1500 grams per minute, into an in-line mixer of conventional design having a 2½ inch rotor whose mixing intensity was controlled over a range of speeds. Simultaneously a nonsolvent, water, was added, as indicated for each example, to the mixer by metered injection to produce the desired ratio of formic acid to water and to induce nucleation of the casting solution and obtain a visible precipitate.

Upon exiting the mixer, the resulting casting composition was filtered through a 10 micrometer filter to remove visible resin particles and was then formed into a thin film on a moving porous, fibrous, polyester nonwoven 10¾" wide continuous web by a doctoring blade with about a 0.008 inch spacing. Within less than 3 seconds the coated web was immersed into a membrane forming bath of the liquid nonsolvent system comprised of a mixture of formic acid and water, as specified for each example, for approximately 1 to 3 minutes. The bath concentration was maintained constant by the continuous addition of water to the bath at the required rate to compensate for solvent diffusion into the bath from the film of the casting composition.

The nylon membrane so formed on the nonwoven, porous polyester support was washed with water for from about 3 to about 6 minutes to remove residual formic acid. Excess water was removed from the nylon membrane by passing it between tensioned rubber wiper blades and the membrane was wound into suitably sized rolls for storage or further processing. For filtration application or testing of nylon membrane in flat sheet form, the membrane sheet was mounted in a restraining frame to prevent shrinkage in any direction and the membrane was oven dried at 290 degrees F. (143.3 degrees C.) for about 5 minutes. The membranes were also converted to filter cartridges by known methods and subjected to testing or filtration application in cartridge form. All parts and percentages herein are by weight unless otherwise specified.

EXAMPLE 1

The continuous casting method, described under General Method I above, was employed to produce a surface modified, microporous, hydrophilic polyamide membrane. The casting solution was prepared by mixing about 549 parts of formic acid, 92.2 parts of a 5 weight percent activated Resin R4308 in water and 108.1 parts of nylon 66 resin pellets. The mixture was mechanically agitated until homogeneous.

The casting solution was pumped into an in-line mixer operating at 3600 RPM at the rate of 1000 grams per minute while water was injected into the mixer at the rate of 36.4 grams per minute. The resulting casting composition was then passed through a 10 micrometer filter to remove visible particles. The casting composition was maintained at a temperature of 48.5 degrees C. (119.3 degrees F.) and was delivered onto the polyester web by means of a doctor blade with an approximately 0.008 inch spacing. The web was passed by the doctoring blade at approximately 50 feet per minute and then into a bath containing 50.1 weight percent formic acid and the balance water. The membrane was then further processed as outlined in Method I, that is, it was washed and then dried in a restraining frame for 5 minutes at 140 degrees C. (284 degrees F.) and was then ready for filter application or testing.

EXAMPLE 2

The method of Example 1 was repeated but with the casting solution made up of about 374.5 parts of formic acid, 53.0 parts of a 5.82% activated solution of Resin R4308 in water, and 72.5 parts of nylon 66 resin. The casting solution was pumped at a rate of 500 grams per minute into an in-line mixer operating at 2718 RPM while water was injected into it at a rate of 24.9 grams per minute. The resulting casting composition was maintained at 54.0 degrees C. (129.2 degrees F.) and was cast onto the polyester web moving at 33 feet per minute. The web was then immersed in a bath containing 55 percent formic acid, the balance water, and then further processed as described previously until ready for filter application or testing.

EXAMPLE 3

The method of Example 2 was repeated except that the operating speed of the in-line mixer was 2717 RPM, and that the water was injected into the mixer at a rate of 17.9 grams per minute. The casting composition temperature was controlled at 54.7 degrees C. (130.4 degrees F.). The coated web was passed into a bath containing 55.4 weight percent formic acid, balance water, at a rate of 33 feet per minute. The membrane was then further processed as previously described until ready for filter application or testing.

EXAMPLE 4

A casting solution composed of about 73.2 weight percent formic acid, 12.3 weight percent water, 14.02 weight percent nylon 66 and 0.43 weight percent activated Resin R4308 was prepared by previously described procedures. The casting solution was pumped into the in-line mixer, operating at 3600 RPM, at the rate of 1000 grams per minute. Water was injected into the mixer at the rate of 32.9 grams per minute and the resulting casting composition was maintained at a temperature of 47.6 degrees C. (117.7 degrees F.). The polyester web was passed by the doctor blade with a 0.008 inch spacing at the rate of 55 feet per minute and into the bath containing 50.1 weight percent formic acid, balance water. The membrane was then further processed as previously described until ready for filter application or testing.

EXAMPLE 5

The membrane forming process of Example 4 was repeated except that the relative weight of nylon 66 and Resin R4308 was adjusted to 2 weight percent Resin R4308 based on the nylon 66, i.e., there were 2 parts of Resin R4308 for 100 parts of nylon 66. The casting solution was delivered to the mixer at the rate of 1000 grams per minute and the resulting casting composition temperature was maintained at 47.5 degrees C. (117.5 degrees F.). The web, moving at 55 feet per minute, was immersed in a bath containing 49.6 weight percent formic acid, balance water. The membrane was then further processed as previously described until ready for testing or filter application.

EXAMPLE 6

The membrane forming process of Example 4 was repeated except that the ratio of Resin R4308 to nylon 66 in the casting solution was adjusted to 1.5 weight percent, i.e., 1.5 parts Resin R4308 to 100 parts nylon 66. Water was introduced into the inline mixer at the rate of 28.7 grams per minute and the casting composition temperature was maintained at 47.1 degrees C. (116.8 degrees F.). The web, moving at 60 feet per minute, was immersed into a bath containing 50.1 weight percent formic acid and the balance water. The membrane was then further processed as previously described until ready for testing or filter application.

EXAMPLE 7

The membrane forming process of Example 4 was repeated except that the ratio of Resin R4308 to nylon 66 was adjusted to 1.25 weight percent in the casting solution, i.e., 1.25 parts Resin R4308 to 100 parts nylon 66. Water was introduced into the mixer at 28.7 grams per minute and the casting composition temperature was maintained at 48.0 degrees C. (118.4 degrees F.). The web, moving at 54 feet per minute, was immersed into a bath containing 50.2 weight percent formic acid, balance water, and then further processed as previously described until ready for testing or filter application.

EXAMPLE 8

The method of Example 1 was repeated, but with the casting solution made up of about 487 parts of formic acid, 58.9 parts of a 2 weight percent activated solution of Resin R4308 in water, 9.9 parts of water and 94.0 parts of nylon 66 resin. The casting solution was pumped at a rate of 500 grams per minute into an in-line mixer operating at 2648 RPM while water was injected into it at a rate of 25.3 grams per minute. The resulting casting composition was maintained at 53.7 degrees C. (128.7 degrees F.) and cast onto the polyester web moving at 34 feet per minute. The web was then immersed into a bath containing 54 percent formic acid, the balance water, and then further processed as previously described until ready for filter application or testing.

EXAMPLE 9

The method of Example 8 was repeated except that the speed of the in-line mixer was 2631 RPM and water was injected into the mixer at a rate of 12.0 grams per minute. The resulting casting composition was maintained at 55.9 degrees C. (132.6 degrees F.) before casting onto the polyester web moving at 30 feet per minute. The web was then immersed into a bath containing 54 percent formic acid, the balance water, and then further processed as previously described until ready for filter application or testing.

EXAMPLE 10

The method of Example 8 was repeated except that the speed of the in-line mixer was 2719 RPM and water was injected into the mixer at a rate of 4.4 grams per minute. The resulting casting composition was maintained at 58.7 degrees C. (137.7 degrees F.) and cast onto the polyester web moving at 22 feet per minute. The web was immersed into a bath containing 54 percent formic acid, the balance water, and then further processed as previously described until ready for filter application or testing.

EXAMPLE 11

The method of Example 8 was repeated except that the speed of the in-line mixer was 2651 RPM and water was injected into the mixer at a rate of 6.5 grams per minute. The resulting casting composition was maintained at 57.4 degrees C. (135.3 degrees F.) and cast onto the polyester web moving at 26 feet per minute. The web was immersed into a bath containing 54 percent formic acid, the balance water, and then further processed as previously described until ready for filter application or testing.

EXAMPLE 12

The method of Example 2 was repeated except that the speed of the in-line mixer was 2719 RPM and water was injected into the mixer at a rate of 7.5 grams per minute. The resulting casting composition was maintained at a temperature of 57.3 degrees C. (135.1 degrees F.) and cast onto the polyester web moving at 22 feet per minute. The web was immersed into a bath containing 55 percent formic acid, the balance water, and was then further processed as described previously until ready for filter application or testing.

The pore diameters of the membranes of Examples 1–12 and a Control membrane, prepared from nylon 66 without added membrane surface modifying polymer, were determined by $K_L$ measurement as described in U.S. Pat. No. 4,340,479 with the results set out in Table I below. The zeta potentials and adsorption capacities of the membranes were also determined, by tests (a) and (b) above respectively, with the results set out in Table I.

TABLE I

| Membrane of Example | Added Weight Percent Resin R4308 Relative To Nylon 66 Resin | Calculated Pore Diameter Micrometers | Zeta Potential In Millivolts At pH = 7.5 | Adsorption Capacity For 0.038 Micrometer Latex In Milligrams Per Square Foot |
|---|---|---|---|---|
| 1 | 4.1 | 0.1 | +15 | 96 |
| 2 | 4.2 | 0.2 | +22 | 106 |
| 3 | 4.1 | 0.45 | +19 | 87 |
| 4 | 3.0 | 0.1 | +13 | 69 |
| 5 | 2.0 | 0.1 | +13 | 87 |
| 6 | 1.5 | 0.1 | +12 | 35 |
| 7 | 1.25 | 0.1 | +13 | 52 |
| 8 | 1.25 | 0.2 | +11 | 21 |
| 9 | 1.25 | 0.8 | +18 | 29 |
| 10 | 1.25 | 3 | +12 | 8 |
| 11 | 1.25 | 1.2 | +16 | 23 |
| 12 | 4.2 | 1.2 | +25 | 42 |
| Control | None | 0.1 | −20 | 0 |

The data in Table I above demonstrate that the present process of preparing surface modified, microporous, hydrophilic membranes produces membranes with positive zeta potentials in alkaline pH. Furthermore, the data in the table demonstrate that membranes with widely differing physical pore diameters can be prepared by this process. Moreover, the listed adsorption capacities for 0.038,μ latex spheres, particles whose diameter is much smaller than the pore size (pore diameter) of these membranes, demonstrates the greatly enhanced particulate removal efficiencies of these membranes compared to the Control membrane, a microporous, hydrophilic nylon 66 membrane made by the process of U.S. Pat. No. 4,340,479. Consequently, the membranes of the present invention are superior to unmodified membranes in ultrafine filtration applications.

The membrane of Example 12 was also tested for its ability to remove the bacterium *Serratia marcescens* from aqueous suspension by the previously described Bacterial Titer Reduction Test Method (test (c) above). For comparative purposes, an identical membrane, but prepared without the added membrane surface modifying polymer, was included in the test evaluation and is designated as Control in Table II.

TABLE II

| | Serratia Marcescens Challenge | |
|---|---|---|
| Membrane of Example | Challenge Organisms Per Square Foot Membrane | Titer Reduction |
| 12 | $10^{11}$ | $5.5 \times 10^6$ |
| Control | $10^{11}$ | $5.5 \times 10^1$ |

The results in the above table demonstrate the greatly enhanced (by nearly 100,000 fold) bacterial removal efficiency of a filter membranes of this invention prepared by the addition of the membrane surface modifying polymer when compared to a similar Control membrane but without surface modification.

The membrane of Example 3 was tested for its ability to remove *E. coli* endotoxin from aqueous suspension by the previously described Endotoxin Titer Reduction Test Method (test (d)). This endotoxin is believed to be of molecular dimensions and exist in rod forms of about 0.001 micrometers in diameter. For comparative purposes, a similar membrane prepared without the added membrane surface modifying polymer was included in the test evaluations and is listed as Control in Table III.

TABLE III

| Membrane of Example | *E. Coli* Endotoxin Concentration, In Nanograms Per Milliliter, Required For Positive Effluent |
|---|---|
| 3 | 100,000 |
| Control | 1 |

Surprisingly, the membranes of the present invention show extremely large improvements in the removal efficiency of bacterial endotoxins when compared to unmodified membranes. The presence of low levels of membrane surface modifying polymer produces about a 100,000 fold increase in the endotoxin removal efficiency of the membrane of the present invention.

Unexpectedly, in addition to being able to remove unwanted materials of biological activity, the membranes of this invention are able to decrease the adsorptive removal of certain desirable components of filterable pharmaceutical preparations. For example, membranes prepared by the method of Example 2 were tested for their ability to pass a solution of benzalkonium chloride, a commonly used preservative in pharmaceutical products, without undue reduction in the concentration of this substance. An aqueous solution of 0.004 percent by weight of benzalkonium chloride was passed through two layers of 47 mm discs at a rate of 3.5 liters per minute per ft$^2$ (929 cm$^2$) and the concentration of the preservative in the effluent relative to that of the influent was determined as a function of throughput volume. For the purpose of comparison, a commercial nylon 66 membrane of the same pore size rating, designated here as Control, was similarly tested.

TABLE IV

| Membrane of Example | Pore Size (Micrometers) | Throughput Required To Obtain Percent Of Influent Concentration (Liters Per Sq. Ft. (929 cm$^2$)) | |
|---|---|---|---|
| | | 90% | 95% |
| 2 | 0.2 | 1.5 | 3.2 |
| Control | 0.2 | 4 | 5 |

The data in Table IV above illustrate that the effluent of filter membranes of this invention reaches acceptable levels substantially before the effluent of the Control. This is of great benefit when filtering such pharmaceutical preparations because there is less wastage of the required amount of preservative.

General Method II: Preparation By Batch Procedure Of The Membranes of Examples 13 and 14

In the following examples, polyamide membranes were prepared containing different membrane surface modifying polymers using the following batch procedure. Membrane casting resin solutions were prepared by dissolving nylon 66 resin pellets of the same nylon 66 as used in Examples 1–12 (or other polyamide as specified in the examples) in a solution of formic acid and the desired surface modifying polymer. Dissolution took place with stirring at about 500 RPM in a jacketed resin kettle maintained at 30 degrees C.. When dissolution was complete (usually within 3 hours), a nonsolvent, water, was added to the solution in an amount sufficient to adjust the final concentration of materials to that given in each example. The water was pumped in at a rate of about 2 ml/min through an orifice about 1 mm in diameter located under the surface of the solution at a point about 1 cm from the stirring blade. Stirring was maintained at about 500 RPM during addition of the water to induce nucleation.

The casting composition was filtered through a 10 micrometer filter, after which about 40 grams of the resulting casting composition was spread out onto a clean glass plate by means of an adjustable gap doctor blade. The film was then promptly immersed in a bath containing formic acid and water in the amounts given in the examples below.

The membranes were held immersed in the bath for several minutes and were then stripped from the glass plate. The membranes were washed in water to remove residual formic acid and were oven-dried for 15 minutes at 96 degrees C. (205 degrees F.) while restrained in a frame to prevent shrinkage. The flat membrane sheets were then used for filter applications or for testing.

EXAMPLE 13

A membrane was prepared according to General Method II with the surface modifying polymer being Polycup ® 1884, a polyamido/polyamino-epichlorohydrin as described above having (1) a specific gravity of 1.12 and (2) a viscosity of 325 centipoise as a 35% aqueous solution. The casting solution contained about 74.2 weight percent formic acid, 10.0 weight percent water, 14.3 weight percent nylon 66 and 1.43 weight percent Polycup ® 1884. The casting composition was spread as a film 0.015 inches thick on a glass plate and immersed in a bath containing 54% by weight formic acid, the balance being water. The membrane was then further processed as described above under General Method II.

The membrane prepared was instantly wetted upon contact with water (less than 1 second) and had a pore size of about 1 micrometer, as determined by $K_L$ measurement. The zeta potential of the membrane was found to be +2.8 mV at a pH of 8.0.

EXAMPLE 14

A membrane was prepared according to General Method II with the polyamide resin being poly(hexamethylene azeleamide), (nylon 6,9), and the surface modifying polymer being activated Resin R4308. The casting solution contained about 65.4 weight percent formic acid, 17.7 weight percent water, 16.0 weight percent nylon 6,9 resin and 0.8 weight percent R4308 resin. The casting composition was spread as a film 0.021 inches thick on a glass plate and was immersed in a bath containing 60 percent by weight formic acid, the balance being water. The membrane was then further processed as described above under General Method II.

The membrane of Example 14 was completely wetted immediately upon contact with water (less than 1 second) and had a pore size of 8 micrometers as determined by $K_L$ measurement. The membrane had a zeta potential of +3 mV at a pH of 8.0. Thus, the membrane prepared by this method was microporous, hydrophilic and exhibited a positive zeta potential at alkaline pH.

The continuous membrane preparation procedure (General Method I described above) was used to prepare a number of membranes, each with a pore size of 0.1 micrometer and containing various levels of added Resin R4308. The preparation of these membranes is described in Examples 1, 4, 5, 6 and 7. The membranes were prepared under identical conditions from casting solutions containing from about 4 weight percent added Resin R4308 to as little as about 1 weight percent. A similar membrane, but without added Resin R4308, was also prepared by the process of U.S Pat. No. 4,340,479 as a comparative example and is designated as Control in the discussion below.

These membranes were tested for their zeta potential at pH = 7.5. All of the membranes prepared with added Resin R4308 (from 1.25 to 4.1 weight percent) had a strongly positive zeta potential. The Control membrane, prepared without added Resin R4308, had a strong negative zeta potential under the same measurement conditions. Thus, even low levels of added Resin R4308 were found to produce membranes with strong positive zeta potential and improved filtration efficiency toward negatively charged particulates in aqueous suspension.

The membranes of Examples 1, 4, 5, 6 and 7 were also converted into filter cartridges by methods known in the art. These filter cartridges were then flushed with 0.2 molar ammonium hydroxide at 50 pounds per square inch pressure across the cartridges for a period of 6 minutes, followed by flushing with 1.5 liters of deionized water. They were then dried for 12 hours at 175 degrees F.. The filter cartridges were then tested for their ability to deliver, within a short time after onset of filtration, high purity effluent water of extremely low ionic content, a requirement for the filtration of electronics grade water. For comparative purposes, a filter cartridge containing the Control membrane, prepared under similar conditions but without the added surface modifying polymer, was included in the test evaluation and is designated Control in Table V. The times for the effluent of these filter cartridges to reach a resistivity of 14 megaohms, as measured by the Resistivity Test described above, along with the zeta potentials and particulate adsorption capacities for the filter membranes are also listed in Table V.

the membranes of the present invention highly desirable for the production of electronics grade water.

The relationship between (1) the time interval, from the onset of filtration, required to produce the required filtrate water resistivity of 14 megaohms/cm (rinse up time as designated in the Resistivity Test described above) and (2) the percent added Resin R4308 is shown in FIG. 1; a plot of rinse up time versus percent added Resin R4308 for each of the above filter cartridges. FIG. 1 illustrates that the rinse up time diminishes linearly with decreasing levels of added Resin R4308. The data in Table V show that at about one to one and one-half percent added Resin R4308, the resulting membrane has a strong positive zeta potential and a rinse up time substantially identical to that of an unmodified membrane. This behavior is highly desirable since this membrane delivers high resistivity water efficiently and yet provides enhanced filtration efficiency through electrostatic effects.

EXAMPLE 15

A surface modified, microporous, hydrophilic polyamide membrane prepared according to the process of the subject invention from the nylon 66 as used in Examples 1-12 and Resin R4308 and having a pore rating of 2 micrometers was tested for its ability to remove haze and haze precursors from commercial cherry brandy comprised of 40 percent alcohol by volume. Prior to filtration, the brandy was chilled to about 0 degrees C. at which temperature it had a distinct, turbid appearance, indicating the presence of an insoluble, dispersed phase of finely divided haze. The test was carried out by passing the chilled cherry brandy through a filter media comprised of two layers of the microporous membrane described above. That is, a disc, 47 millimeters in diameter, and comprised of two layers of the membrane described above was mounted in a membrane holding device and the chilled cherry brandy was then passed through this filter medium at a rate of 0.5 liters per minute per square foot (per 929 cm$^2$) of membrane surface area.

The initial pressure drop across the filter medium was 4.5 psi. After 5 hours onstream, the pressure drop had increased to 7.2 psi. Over the 5 hours of filtration, the filter effluent had a crystal clear appearance, without evidence of any haze. The total volume of cherry brandy filtered over the 5 hour period corresponded to

TABLE V

| Membrane of Example | Weight Percent R4308 Added To Nylon 66 Resin | Zeta Potential In Millivolts at pH = 7 | Adsorption Capacity Of 0.038 Micrometer Latex Spheres In Milligrams Per Square Foot | Time In Minutes For Effluent To Reach 14 Megaohms Per Centimeter Resistivity |
|---|---|---|---|---|
| 1 | 4.1 | +15 | 96 | 22 |
| 4 | 3.0 | +13 | 69 | 15 |
| 5 | 2.0 | +13 | 87 | 7.5 |
| 6 | 1.5 | +12 | 35 | 2.0 |
| 7 | 1.25 | +13 | 52 | 2.5 |
| Control | None | −20 | 0 | 2.5 |

The results in the table show that the membranes of the present invention have novel properties useful in electronics water filtration when compared to prior art membranes. The present surface modified membranes have positive zeta potentials in alkaline media, vastly improved removal efficiencies for ultrafine particulates and the ability to deliver purified effluent of extremely low ionic content in rapid fashion after the onset of filtration. This novel combination of properties makes 125 liters per square foot (per 929 cm$^2$) of filter medium. After filtration, the cherry brandy was allowed to warm up to ambient temperature. No haze developed. Further, even after recooling, the cherry brandy remained haze free.

This Example demonstrates that a membrane of the subject invention is useful for treating alcoholic beverages to render them haze free and stable against haze formation.

EXAMPLE 16

To further demonstrate the ability of the membranes of the subject invention to operate in a clean manner as required in certain filtration applications, such as the manufacture of near theoretical resistivity water for electronics manufacture, a series of elements A-D, as described below, were tested for "extractables" by the process described below.

In this series of tests, corrugated filter elements of conventional design having an effective surface area of about 5 square feet were prepared by conventional means from three different microporous membranes. These elements, labeled A through D in Table VI below, were prepared from membranes which themselves were initially prepared by the processes indicated below:

| Element | |
|---|---|
| A | A hydrophilic, microporous polyamide membrane with a pore rating of 0.2 micrometers was prepared by the general process described in U.S. Pat. No. 4,340,479 from the same nylon 66 as used in Examples 1-12. The formed membrane was coated with Resin R4308 by impregnating the membrane with a 3 percent by weight solution of Resin R4308 in water, the Resin R4308 having been activated according to the manufacturer's recommendations, following which the membrane was wiped to remove excess resin and thereafter formed into the filter element denoted as element A in Table VI below. |
| B | The membrane of elements B was prepared by the same process as described above with regard to the membrane of element A. This membrane also had pore rating of 0.2 micrometers. |
| C | This membrane was prepared by the cocasting process of the subject invention from (1) the same nylon 66 as the membranes of elements A and B above and (2) Resin R4308. The resulting membrane also had a pore rating of 0.2 micrometers and was comprised of 98 percent polyamide and 2 percent by weight Resin R4308. |
| D (Control) | This Control membrane was prepared by the process described in U.S. Pat. No. 4,340,479 from the same nylon 66 as elements A and B above. The resulting membrane also had a pore rating of 0.2 micrometers. It did not contain a modifying polymer as either (1) an integral part of the structure (as did element C) or (2) a coating component of the membrane (as in the case of elements A and B). |

The filter elements A through D as described above were tested as follows:

Elements A and B were each (separately) subjected to a leaching step by passing 0.5 gallons per minute per element of room temperature, deionized water through the respective element for the time specified in Table VI below. This leaching step was carried out in an effort to remove as much soluble material from elements A and B as possible. Neither element C nor element D was given the benefit of this treatment.

After the water leaching step carried out with elements A and B, each of the elements was individually subjected to a room temperature, deionized water flush at the pressure and for the time specified in Table VI below. Note that the flushing times and pressures resulted in a total flow of water through each individual element of about 50 gallons (elements A and B) and 60 gallons (elements C and D).

After the deionized water flushing step, the elements were dried at 205 degrees F. for about 12 hours, autoclaved with steam at 121 degrees C. for about 1 hour and then extracted (again, each element separately) with deionized water. The extraction step was carried out by by plugging the bottom of each element and then placing each element in its own bath of one and one-half liters of deionized water, following which each of the elements was reciprocated in an up and down manner (with the top of the filter element rising about 5 centimeters above the upper level of the bath on the upstroke) for 4 hours.

In each case, the water in the bath was then evaporated and the non-volatile residue remaining behind weighed to determine the extractable material in each filter element. The values are set out in Table VI below.

TABLE VI

| Element | Deionized Water Leach | Deionized Water Flush | Extractable Material (mg) | Zeta Potential (mv) |
|---|---|---|---|---|
| A | 30 min. | 5 min. at 20 psi | 96 | 18–20 |
| B | 60 min. | 5 min. at 20 psi | 68 | 18–20 |
| C | None | 3 min. at 50 psi | 27 | 18–20 |
| D | None | 3 min. at 50 psi | 25 | −18 |

As can be seen from Table VI, elements C and D had substantially reduced extractables compared with the elements prepared from coated polyamide membranes (A and B). This was the case even though elements A and B were given a deionized water leach (of 30 and 60 minutes respectively). As can also be seen from Table VI, element C, prepared by the cocast process of this invention, had a low level of extractables comparable to the Control element D. However, element C combines the desirable positive zeta potential at pH 7 (as well as at higher pH levels) with the low extractables of the Control D which has, for many purposes, the undesirable negative zeta potential at pH 7 (and at higher pH values as well).

Industrial Applicability

The surface modified membranes of the present invention have been demonstrated to be superior in many important filtration related properties to untreated prior art membranes. They are also superior in many respects to coated membranes, e.g., in improved efficiency in utilization of the surface modifying polymer and in certain surface properties of the comparative end products. They can be used for filtering applications in their manufactured form, with or without the incorporation of the substrate upon which they are found. Two or more membranes can be combined or secured to each other to form multiple layer membrane filter sheets or they may be converted into filter elements by known methods and employed in filter cartridges, e.g., as filter elements in the form of a corrugated sheet supported within a conventional cartridge.

The membranes of this invention display positive zeta potentials over a broad pH range of from about 3 to about 10 and show greatly enhanced removal efficiencies toward negatively charged particles in aqueous suspension. Furthermore, they have enhanced efficiency to remove bacteria and endotoxins from aqueous fluids. Moreover, the improved physical and chemical properties coupled with their ability to quickly deliver high purity effluent water, free from microparticulate and ionic contaminants, makes them particularly desirable for use in microelectronics manufacture.

These membranes find use in industry and the medical field for treatment of water supplies for critical applications such as water for injection into humans, in microelectronics manufacture for the reasons discussed above, for the filtration of blood serum to help achieve sterility, for filtration of parenteral fluids, and generally for any use where an ion containing fluid must be filtered to a high degree of clarity.

We claim:

1. A process for preparing a surface modified, skinless, hydrophilic, microporous, alcohol-insoluble polyamide membrane that is readily wetted by water which comprises:
   (1) preparing a casting solution comprised of (A) a casting resin system comprised of (a) an alcohol-insoluble polyamide resin having a ratio $CH_2$:NHCO of methylene $CH_2$ to amide NHCO groups within the range of from about 5:1 to about 7:1, and (b) a cationic, water-soluble, quaternary ammonium, thermosetting, membrane surface modifying polymer and (B) a solvent system in which said casting resin system is soluble;
   (2) inducing nucleation of said casting solution by controlled addition of a nonsolvent for said casting resin system under controlled conditions of concentration, temperature, addition rate and degree of agitation to obtain a visible precipitate of casting resin system particles, thereby forming a casting composition;
   (3) spreading said casting composition on a substrate to form a thin film thereof on the substrate;
   (4) contacting and diluting the film of said casting composition with a liquid nonsolvent system for said casting resin system comprised of a mixture of solvent and nonsolvent liquids, thereby precipitating said casting resin system from said casting composition in the form of a thin, skinless, hydrophilic, surface modified, microporous, polyamide membrane;
   (5) washing said membrane to remove solvent; and
   (6) drying said membrane.

2. The process of claim 1 in which precipitated casting resin system particles are redissolved before spreading said casting composition on said substrate.

3. The process of claim 1 in which precipitated casting resin system particles are filtered out before spreading said casting composition on said substrate.

4. The process of claim 1 in which said polyamide resin is polyhexamethylene adipamide.

5. The process of claim 4 in which said membrane surface modifying polymer is a polyamine epichlorohydrin, said solvent system comprises formic acid and water, said nonsolvent added to induce nucleation is water, and the polyamide resin concentration in said casting solution is from about 10 to about 18%, the concentration of said polyamine epichlorohydrin polymer in said casting solution is from about 0.1 to about 0.9%, the concentration of formic acid in said casting solution is from about 65 to about 75%, and the concentration of water in said solution is from about 10 to about 20%.

6. The process of claim 1 in which said polyamide resin is poly-e-caprolactam.

7. The process of claim 1 in which said polyamide resin is polyhexamethylene sebacamide.

8. The process of claim 1 in which said polyamide resin is polyhexamethylene adipamide, said solvent system for said casting resin system comprises formic acid, and said nonsolvent added to induce nucleation is water.

9. The process of claim 8 wherein said solvent system for said casting resin system comprises formic acid and water.

10. The process of claim 1 in which the film of casting composition is contacted with said liquid nonsolvent system by immersing said film carried on said substrate in a bath of said liquid nonsolvent system.

11. The process of claim 1 wherein said polyamide resin is present in said casting solution in an amount of from about 10 to 18%, said membrane surface modifying polymer is present in an amount of from about 0.1 to 0.9%, said solvent system comprises formic acid and water and wherein said formic acid is present in said casting solution in an amount of from about 60 to 80%, and said water is present in said casting solution in an amount of from 0 to about 30%.

12. The process of claim 1 in which said membrane surface modifying polymer is a polyamine epichlorohydrin polymer.

13. The process of claim 1 in which said membrane surface modifying polymer is a polyamido/polyamino-epichlorohydrin polymer.

14. The process of claim 1 in which said casting composition is continuously spread onto said substrate, said thin film of said casting composition is continuously immersed in a bath of said liquid nonsolvent system, and the bath is maintained at a substantially constant composition with respect to nonsolvent and solvent by the addition of nonsolvent to the bath in a quantity sufficient to compensate for solvent diffusion into the bath from said thin film of said casting composition.

15. The process of claim 14 in which the substrate is a porous web having an open structure which is wetted and impregnated by the casting composition, thereby forming a membrane film having the porous web incorporated as a part thereof.

16. The process of claim 15 in which the substrate is a porous, fibrous polyester sheet.

17. The process of claim 1 in which said membrane is stripped from said substrate after washing and before drying.

18. The surface modified, skinless, hydrophilic, microporous, alcohol-insoluble, polyamide membrane product of the process of claim 1.

19. A process for preparing a surface modified, skinless, hydrophilic, microporous, alcohol-insoluble polyhexamethylene adipamide resin membrane that is readily wetted by water and which has pores that are substantially uniform from surface to surface which comprises:
   (1) preparing a casting solution comprised of (A) a casting resin system comprised of (a) an alcohol-insoluble polyhexamethylene adipamide resin in a concentration within the range from about 10% to about 18% by weight and (b) a cationic, water-soluble, quaternary ammonium, thermosetting, membrane surface modifying polyamine-epichlorohydrin resin or polymer in a concentration within the range of from about 0.1% to about 0.9% and (B) a solvent system comprised of (a) formic acid in a concentration of from about 65% to about 75% and (b) from 10 to about 20% water (all percentages based on the weight of all the components in said solution);

(2) inducing nucleation of said casting solution by adding water thereto while controlling temperature, rate of addition of water and degree of agitation to obtain a visible precipitate of casting resin system particles, thereby forming a casting composition;

(3) spreading said casting composition on a polyester substrate to form a thin film of said casting composition thereon;

(4) contacting and diluting said thin film of said casting composition with an aqueous solution containing from about 37% to about 55% formic acid, thereby precipitating said casting resin system from said casting composition as a thin, surface modified, skinless, hydrophilic, microporous, polyamide membrane;

(5) washing said membrane to remove formic acid; and (6) drying said membrane.

20. The process of claim 19 in which said membrane is stripped from said substrate after washing and before drying.

21. The process of claim 19 in which at least a portion of said visible precipitate of casting resin system particles is redissolved before spreading said casting composition on said substrate.

22. The process of claim 19 in which said visible precipitate of casting resin system particles is filtered out before spreading said casting composition on said substrate.

23. A charge modified, skinless, hydrophilic, microporous, alcohol-insoluble polyamide membrane derived from an alcohol-insoluble hydrophobic polyamide resin having a ratio $CH_2NHCO$ of methylene $CH_2$ to amide $NHCO$ groups within the range of from about 5:1 to about 7:1, said membrane having an integral microstructure whose characteristics are substantially controlled by cationic, quaternary ammonium groups of a cationic, quaternary ammonium, thermoset, charge modifying polymer homogeneously distributed in said membrane, thereby providing a positive zeta potential in alkaline media.

24. The microporous, alcohol-insoluble polyamide membrane of claim 23 having through pores extending from surface to surface that are substantially uniform in shape and size.

25. The microporous, alcohol-insoluble polyamdie membrane of claim 23 having through pores extending from surface to surface that are tapered, wider at one surface of the sheet and narrowing as they proceed toward the opposite surface of the membrane.

26. The microporous, alcohol-insoluble polyamide membrane of claim 23 having pore ratings of 0.04 micrometers to 10 micrometers.

27. The microporous, alcohol-insoluble polyamide membrane of claim 23 having pore ratings of 0.1 micrometer to 5 micrometers.

28. The microporous, alcohol-insoluble polyamide membrane of claim 23 in which said polyamide resin is polyhexamethylene adipamide.

29. The microporous, alcohol-insoluble polyamide membrane of claim 28 wherein said time to reach an effluent resistivity of 14 megaohms/cm is 10 minutes or less.

30. The microporous, alcohol-insoluble polyamdie membrane of claim 28 wherein said time to reach an effluent resistivity of 14 megaohms/cm is 5 minutes or less.

31. A method for the filtration of particulates from a fluid medium comprising passing said medium through the microporous, alcohol-insoluble polyamide membrane of claim 28.

32. The microporous, alcohol-insoluble polyamide membrane of claim 23 comprising two of said membranes secured to each other and forming a multiple layer membrane filter.

33. The microporous, alcohol-insoluble polyamide membrane of claim 32 comprising a supported membrane and an unsupported membrane.

34. The multiple layer membrane of claim 33 having pore ratings of from 0.04 to 10 micrometers.

35. The multiple layer membrane of claim 33 having pore ratings of 0.1 t 5 micrometers.

36. The multiple layer membrane of claim 33 wherein said polyamide resin comprises polyhexamethylene adipamide.

37. The multiple layer membrane of claim 33 wherein each layer has a thickness of from about 0.1 to about 1.5 millimeters.

38. The multiple layer membrane of claim 33 wherein each layer has a thickness of from about 0.025 to about 0.8 millimeter.

39. The multiple layer membrane of claim 33 formed by drying the wet unsupported layer in contact with the wet supported layer.

40. A filter element comprised of the charge-modified, skinless, hydrophilic, microporous, alcohol-insoluble polyamide membrane of claim 33.

41. The filter element of claim 40 in which said membrane is in the form of a corrugated sheet.

42. A method for the filtration of particulates from a fluid medium comprising passing said medium through the membrane of claim 33.

43. The method of claim 42 wherein said medium comprises water.

44. The microporous, alcohol-insoluble polyamide membrane of claim 23 having a thickness within the range of from about 0.01 to about 1.5 mm.

45. A filter element comprised of the surface modified, skinless, hydrophilic, microporous, alcohol-insoluble polyamide membrane of claim 23.

46. The filter element of claim 45 in which said membrane is in the form of a corrugated sheet.

47. A method for the filtration of particulates from a fluid medium comprising passing said medium through the microporous, alcohol-insoluble polyamide membrane of claim 65.

48. The method of claim 47 wherein said medium comprises water.

49. A charge modified, skinless, hydrophilic, microporous, alcohol-insoluble polyamide membrane derived from about 80 to about 99.9 percent of an alcohol-insoluble, hydrophobic polyamide resin having a ratio $CH_2: NHCO$ of methylene $CH_2$ to amide $NHCO$ groups within the range of from about 5:1 to about 7:1 and from about 20 to about 0.1 percent of a cationic, quaternary ammonium, thermoset, charge modifying polymer homogeneously distributed in said membrane, said membrane having an integral microstructure whose characteristics are substantially controlled by cationic, quaternary ammonium groups of said modifying polymer, thereby providing a positive zeta potential in alkaline media.

50. The membrane of claim 49 wherein said polyamide is polyhexamethylene adipamide and said modifying polymer is polyamine-epichlorohydrin present in said membrane in an amount of from about 1 to about 5 percent.

51. The membrane of claim 50 wherein said modifying polymer is present in said membrane in an amount of from about 1 to about 2 percent.

52. The charge-modified, skinless, hydrophilic, microporous, alcohol-insoluble polyamide membrane of claim 49 comprising two of said membranes secured to each other and forming a multiple layer membrane filter sheet.

53. The multiple layer membrane of claim 52 comprising a supported membrane and an unsupported membrane.

54. The multiple layer membrane ot claim 53 having pore ratings from 0.04 to 10 micrometers.

55. A filter element comprised of the charge-modified, skinless, hydrophilic, microporous, alcohol-insoluble, polyamide multilayer membrane of claim 54.

56. The filter element of claim 55 in which said multilayer membrane is in the form of a corrugated sheet.

57. The multiple layer membrane of claim 53 having pore ratings of from 0.1 to 5 micrometers.

58. The multiple layer membrane of claim 53 in which said polyamide resin comprises polyhexamethylene adipamide.

59. The multiple layer membrane of claim 53 wherein each layer has a thickness of from about 0.01 to about 1.5 millimeters.

60. The multiple layer membrane of claim 53 wherein each layer has a thickness of from about 0.025 to about 0.8 millimeter.

61. The multiple layer membrane of claim 53 formed by drying the wet unsupported layer in contact with the wet supported layer.

62. A method for the filtration of particulates from a fluid medium comprising passing said medium through the multilayer membrane of claim 52.

63. The method of claim 62 wherein said medium comprises water.

64. A charge modified, skinless, hydrophilic, microporous, alcohol-insoluble polyhexamethylene adipamide membrane derived from about 80 to about 99.9 percent of an alcohol-insoluble, hydrophobic polyhexamethylene adipamide resin and from about 20 to about 0.1 percent of a cationic, quaternary ammonium, thermoset, charge modifying polymer homogeneously distributed in said membrane, said membrane having an integral microstructure whose characteristics are substantially controlled by quaternary ammonium groups of said modifying polymer, thereby providing a positive zeta potential in alkaline media.

* * * * *